Aug. 17, 1954  B. STAHMER  2,686,540
POTATO CHIP PIERCING MACHINE
Filed July 5, 1949  2 Sheets-Sheet 1

Inventor
Bernhardt Stahmer
By A. Hiram Sturges
Attorney

Aug. 17, 1954  B. STAHMER  2,686,540
POTATO CHIP PIERCING MACHINE
Filed July 5, 1949  2 Sheets-Sheet 2
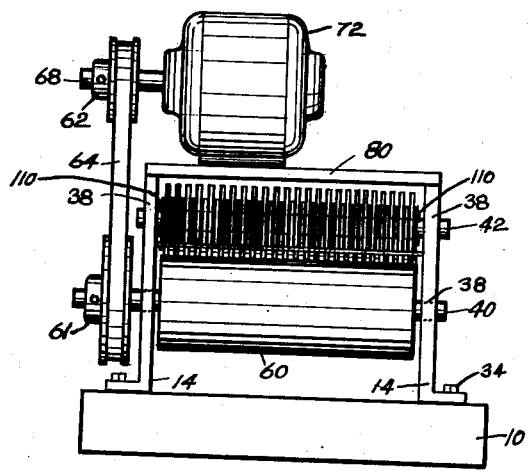
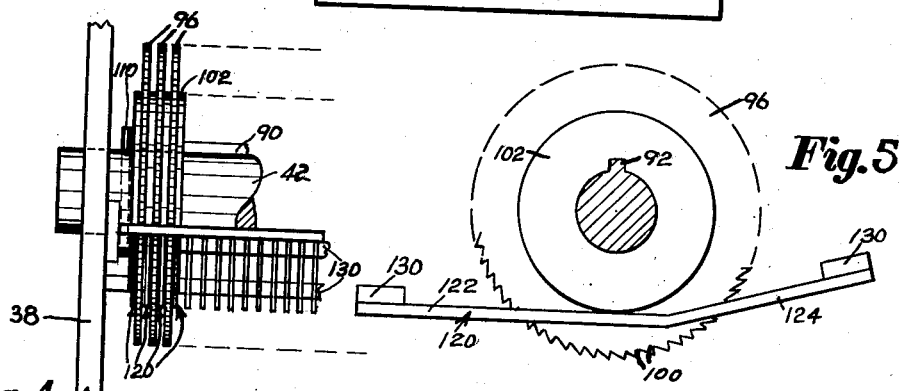
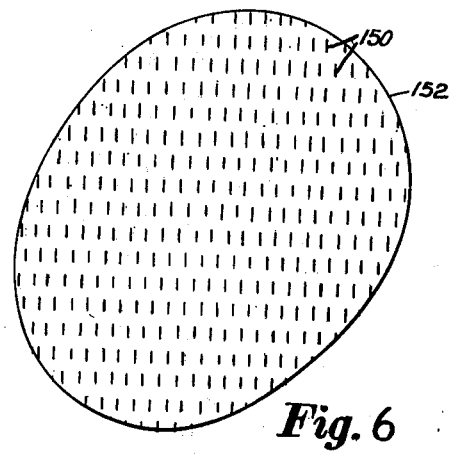
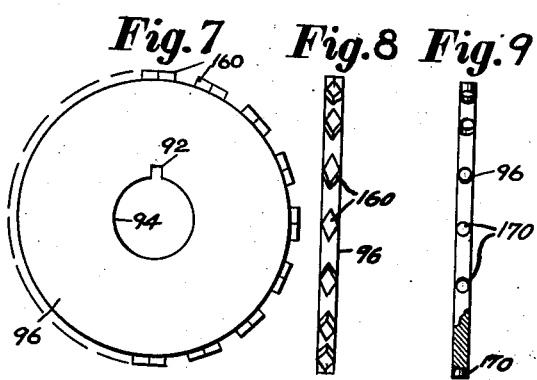
Inventor
Bernhardt Stahmer
A. Hiram Sturges
Attorney Patented Aug. 17, 1954

2,686,540

UNITED STATES PATENT OFFICE 2,686,540

POTATO CHIP PIERCING MACHINE

Bernhardt Stahmer, Omaha, Nebr.

Application July 5, 1949, Serial No. 103,060

2 Claims. (Cl. 146—1)

This invention relates to the manufacture of potato chips and more particularly it is an object of this invention to provide a machine for producing a more edible potato chip than heretofore.

It is, therefore, an object of this invention to provide a machine which is adapted to pierce potato chips of the flat, common "Saratoga" type across their faces and at great speed.

Another object of the invention is to provide a piercing machine as described which is adapted to pierce potato chips even faster than they are sliced by present methods.

Another object of the invention is to provide a machine as described in which the piercing elements are spaced apart as described, which is adapted to produce a potato chip in which the individual piercings are proportionately spaced from one another to permit the chip to be uniformly cooked.

Yet a further object of the invention is to provide a machine for making a chip which can be quickly soaked in water for removing more of the starch content of the chip than has been heretofore possible.

Still a further object of the invention is to provide a machine for making a fast cooking chip having piercings through which boiling cooking oils can pass.

Another object resides in the provision of a machine for producing a chip of great strength.

Yet a further object resides in the provision of a potato chip piercing machine for providing chips which are tenderized during cooking. The tenderizing adding greatly to their palatability.

Another object of the invention resides in the provision of a piercing machine for making potato chips of a type requiring a lesser cooking time for effecting a saving of fuel in manufacture.

A most important object of the invention resides in the provision of a machine for use in the manufacture of potato chips which are more crisp than heretofore, crunching more easily during chewing for avoiding the sticky, dough-like, mass of masticated potato chip present on the teeth during chewing of potato chips of the prior art.

Still another object of the invention resides in the provision of a machine which is adapted to produce potato chips of more novel appearance than potato chips of the same general type have had heretofore.

Yet another object of the invention is to provide a potato chip piercing device which is adapted for the piercing of chips with many kinds of shapes of piercing including round piercings, diamond-shaped piercings, rectangular-shaped piercings and others as desired.

A further object of the invention is in the provision of a machine which is adapted to be adjusted in such manner that the spacing of adjacent rows of piercings in a potato chip product can be adjusted beforehand in different ways for producing a great variety of designs on potato chips.

Another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

In the drawings:

Figure 3 is a right end elevation of the machine of Figure 1.

Figure 4 is an enlarged end elevation of a portion of the piercing-disc-carrying shaft of the invention including discs and adjacent parts, the positions of other discs and other spacing members being indicated in dotted lines.

Figure 5 is a right end view of the parts shown in Figure 4, with the exception of the shaft mounting member thereof, a portion of a piercing disc or wheel being shown having teeth in full lines, the outline of the teeth of the remainder of the wheel being shown in dotted lines only for convenience of illustration.

Figure 6 is a top plan view of a potato chip after being pierced by the machine of this invention.

Figure 1:
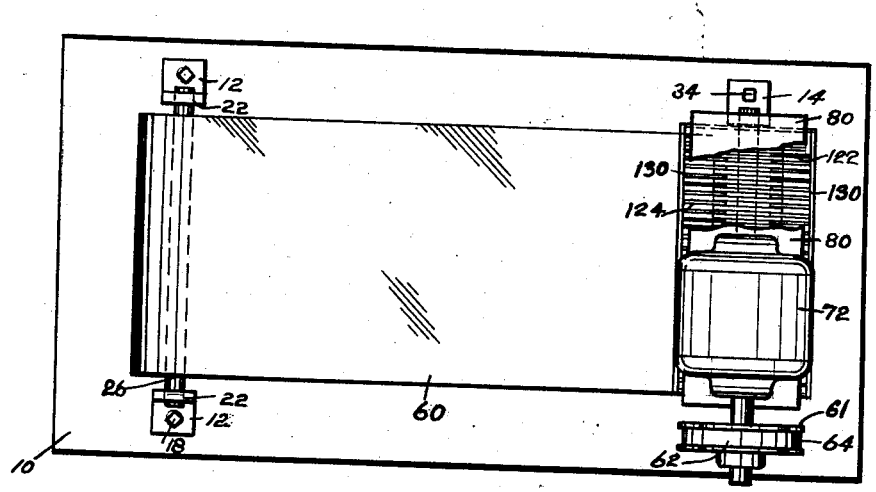
Figure 1 is a top plan view of the potato chip piercing machine of this invention, a portion of the motor mounting platform thereof being broken away.

Figure 7 is an enlarged side elevation of a modified potato chip piercing disc of the invention in which the teeth of the disc are provided with rectangular or diamond shaped heads. Only a portion of the disc is shown with diamond shaped heads in full lines, it being understood that the remainder of the disc is also provided with diamond shaped teeth. The outline of the diamond shaped teeth of the remainder of the disc is shown in dotted lines for convenience of illustration.

Figure 8 is a frontal elevation of the disc of Figure 7.

Figure 9 is an enlarged frontal elevation of another modified disc of the invention; the disc of Figure 9 being provided with teeth having circular outer ends. A portion of the disc is broken away for showing the side of one of the teeth more clearly.

The potato chip piercing machine of this invention is provided with a suitable base 10 having an upper surface normally horizontally disposed. On the base 10 four brackets are provided and are arranged in pairs 12 and 14 respectively.

The brackets 12 are disposed in spaced apart positions at one end of the platform 10 and are in the shape of a right angle, each straight portion of each of the brackets 12 having an aperture therethrough.

The apertures 16 through those portions of the brackets 12 which are disposed adjacent the base 10 are for the purpose of receiving bolts 18 for attaching the brackets 12 to the base 10. Those portions of the brackets 12 which are upstanding are provided with apertures 22 shown in dotted lines for receiving the opposite ends of a roller shaft 26. Upon the roller shaft 26 a cylindrical roller 30 is mounted.

The brackets 14 form with the base 10 and brackets 12 the frame of the machine and the brackets 14 are similarly constructed to the brackets 12 although the upstanding portions thereof are longer. The brackets 14 are secured to the base 10 by means of bolts 34 and the upstanding portion of each bracket 14 is provided with two vertically spaced transverse apertures 38 through which two shafts 40 and 42 are rotatably secured.

Figure 2:
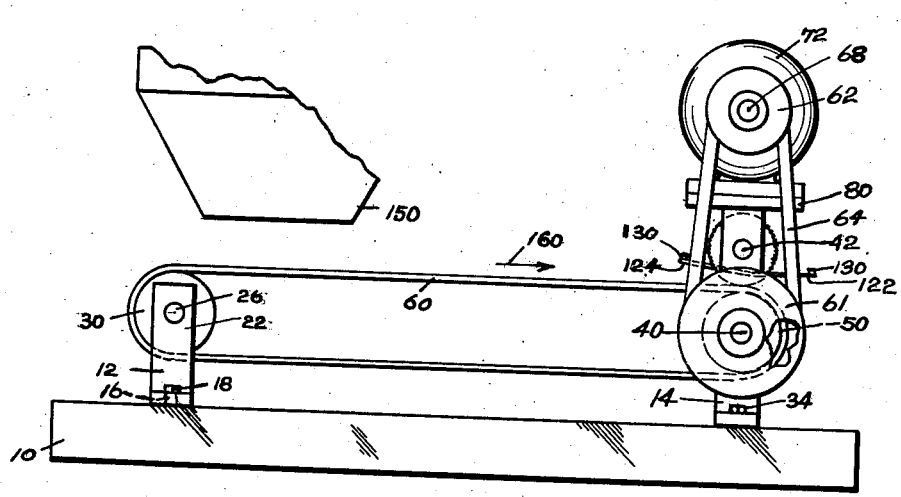
Figure 2 is a side elevation of the machine of Figure 1, a portion of a hopper for delivering potato chips to the machine of this invention being shown above the conveyor belt of the machine, a portion of the conveyor belt being shown in dotted lines.

The shafts 40 and 42 are disposed one above the other in horizontal alignment. On the shaft 40 a roller 50 is positioned as best seen in Figure 2.

The roller 50 is preferably formed of a resilient material such as rubber which is adapted to be compressed at times and yet return to its former shape. The roller 50 is of cylindrical shape and is preferably of the same size as the roller 30.

About the rollers 30 and 50 an endless belt 60 is provided. The belt 60 has a flat supporting surface preferably formed of resilient material such as rubber or the like also having the qualities of compressibility and ability to return to its original shape after a compressing force has been removed.

The lower shaft 40 preferably extends outwardly on one side of one of the brackets 14 for receiving a pulley 61 thereon which latter is drivably secured to a driving pulley 62 by means of a suitable belt 64. The driving pulley 62 is secured to the drive shaft 68 of an electrical motor 72. The motor 72 is itself mounted upon a platform 80 which latter is transversely disposed in horizontal position across the tops of the brackets 14.

The upper shaft 42 is provided with an elongated straight key-way ridge 90 on one side thereof and extending between the brackets 14. The key-way 90 is for the purpose of receiving thereon the walls of a key-way notch 92 which latter extends outwardly from the walls of a circular opening 94 in each of a plurality of piercing discs 96. The ridge 90 is preferably rectangular in cross-section and the notches 92 are preferably complementarily shaped rectangularly.

The discs 96 are provided on their outer edges with a plurality of piercing teeth 100. The teeth 100 are each shaped similarly to the teeth of a circular saw, as best seen in Figure 5, each tooth 100 is preferably of triangular shape in side elevation and the outer ends thereof slant in a direction opposite to the direction of rotation of the discs and rearwardly of the machine in the direction opposite to the direction of travel of the belt 60.

The teeth 100 of the several discs 96 form together the configuration of a cylinder so that all engage the belt 60 in their turn.

The discs 96 are maintained spaced apart from one another on the shaft 40 by means of spacing washers 102. The latter are of lesser diameter than the discs 96 and can all be alike and of uniform thickness, if desired.

The discs 96 and the washers 102 are held on the shaft 42 by means of pins 110.

It will be also seen that the discs 96 can be arranged in groups if desired. In this fashion, one group of discs could be spaced apart a greater distance from adjacent groups than members of each group are spaced apart from each other. In the arrangement illustrated, however, the discs 96 are equidistantly spaced apart.

Between each of the discs 96 a push-off bar 120 is provided. The push-off bars 120 together form a plurality of parallel combing teeth, for preventing potato chips from sticking to the discs 96 in operation.

Each bar 120 is provided with a normally horizontal forward portion 122 and an upwardly inclined rearwardly extending portion 124. The purpose of the inclination of the portion 124 is for guiding potato chips therebeneath and to the discs 96.

Two transverse supporting bars 130 are provided and are secured to the combing bars 120 at the opposite ends thereof. The supporting bars 130 are disposed one on each side of the discs 96 and the ends of the bars 130 are suitably secured to the brackets 14 in a rigid manner.

In operation, it will be seen that potato chips falling downwardly on the belt 60 from the lower end of a hopper 150, best seen in Figure 1, will travel in the direction of the arrow 160 with the belt 60. The potato chips coming from the hopper 150 are preferably uncooked and of the "Saratoga" type having flat sides.

The chips will engage the undersides of the portions 124 of the combing bars 120 and will be guided between the piercing-discs or wheels 96 and the adjacent resilient belt 60.

The teeth 100 are normally disposed bearing down upon the resilient belt 60; consequently, when the potato chips pass between the teeth 100 and the belt 60, the chips are perforated with a plurality of minute piercings 150 as best seen on the potato chip 152 of Figure 6.

The piercings 150 are disposed in rows, each row being formed by a single one of the piercing-wheels 96. The piercings of a row are equidistantly spaced apart as are the points of the teeth 100. Each of the piercings 150 is elongated and is of the length the width of teeth 100. The piercings 150 are all disposed in parallelism.

It will be seen that the rows of piercings can be spaced apart in any desired manner for making different designs by placing more or fewer washers 102 between different ones of the piercing-discs 96.

Other modifications of the teeth can be used if desired. One such modification is shown in Figure 7 in which the teeth 160 of the wheel 96 thereshown, are provided with rectangular or diamond shaped outer ends as seen in edge view. The perforations formed by the diamond shaped teeth are consequently diamond shaped for providing a very novel potato chip.

Another modification of the teeth 100 is described in Figure 9 in which the teeth 170 of the wheel 96 thereshown are provided with flat circular outer surfaces as seen in edge view. In the modifications of Figures 7 and 9 the respective diamond and circular surfaces are disposed at right angle with respect to radii of the corresponding discs.

It will be seen that in addition to the rectangular or diamond shaped teeth 160 and the circular teeth 170 many other shapes of teeth can be employed.

It has been found in practice that the piercings cause the potato chip to cook more rapidly and uniformly, reducing fuel consumption; to have less starch content because of the ease with which soaking water can act on a larger surface area, because of the absence of blisters, because of the lesser amount of oil in cooking consumed due to the absence of oil-trapping blisters, a chip which is more crisp, stronger, and more edible and a chip which is of more novel and marketable appearance.

From the foregoing description it is thought to be obvious that a potato chip piercing machine constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as claimed.

I claim:

1. A machine for piercing flat piercible objects comprising: a frame; a conveyor belt, said conveyor belt having a substantially horizontal upper surface adapted to receive piercible objects thereon at a receiving end thereof; rotatable piercing means disposed adjacent said belt in a position spaced apart from said receiving end of said belt, said piercing means being rotatably mounted on said frame for rotation about an axis transverse with respect to the direction of travel of said belt for defining entrance and exit sides of said configuration, said piercing means having a plurality of outstanding teeth disposed with their outer ends defining a substantially cylindrical configuration, said teeth being arranged in groups, each group including spaced apart teeth following each other and disposed in a circle, each group being spaced axially from adjacent groups, said configuration being disposed sufficiently close to said belt that when piercible objects are carried by said belt past positions between said teeth and said belt said piercible objects will be pierced by said teeth; means for causing said belt to move to carry said objects from said receiving end to said piercing means; the linear movement of the periphery of the rotatable piercing means being substantially the same as that of the belt; combing members attached to said frame and disposed between said groups of teeth adjacent said surface, said combing members extending in directions transverse to said axis and projecting beyond the periphery of said configuration on the exit side of said configuration, said combing members also extending beyond the periphery of said configuration on the entrance side thereof and being upwardly inclined on their entrance ends to form a wedging and guiding entrance, the lower surfaces of said combing members being substantially unobstructed; and means securing said combing members to said frame, the area above said belt from said receiving end to said entrance being unobstructed up to a height of at least as high as the bottom of the receiving ends of the combing members.

2. A machine for piercing flat piercible objects comprising: a frame; a conveyor belt having a movable surface for engagement with said objects whereby when said objects come in contact with said surface they are caused to move with said surface; rotatable piercing means disposed adjacent said surface; said piercing means being rotatably mounted on said frame for rotation about an axis transverse to the direction of travel of said surface, said piercing means having a plurality of outstanding teeth disposed with their outer ends defining a substantially cylindrical configuration, said teeth being arranged in groups, each group including spaced apart teeth following each other and disposed in a circle, each group being spaced axially from adjacent groups, said configuration being disposed sufficiently close to said movable surface that when piercible objects are carried by said surface past positions between said teeth and said belt said piercible objects will be pierced by said teeth, such construction defining a piercing area having entrance and exit sides; means for causing said movable surface to move whereby said surface carries said objects to said piercing area; the linear movement of the periphery of the rotatable piercing means being substantially the same as the movable surface; combing members attached to said frame and disposed between said groups of teeth adjacent said surface, said combing members extending in directions transverse to the axis of said piercing means and projecting beyond the circumference of said configuration on the exit side of said piercing area, said combing members also extending beyond the circumference of said configuration on the entrance side of said piercing area and being upwardly inclined on their entrance ends to form a wedging and guiding entrance, said entrance having walls formed by said combing members on one side and by said movable surface on an opposite side, the walls so formed being inclined with respect to each other to form a wedging and guiding entrance whereby piercible objects entering the entrance are carried into the piercing area even though they are piled one overlapping another, those sides of said combing members which form the walls of said entrance being smooth and unobstructed for the free passage of piercible objects into said piercing area even though they are piled one overlapping another; and means securing said combing members to said frame.

References Cited in the file of this patent

UNITED STATES PATENTS

| Number | Name | Date |
|---|---|---|
| 264,449 | Fahs | Sept. 19, 1882 |
| 536,778 | Chase | Apr. 2, 1895 |
| 551,967 | Horton | Dec. 24, 1895 |
| 574,470 | Averell | Jan. 5, 1897 |
| 659,579 | Chase | Oct. 9, 1900 |
| 866,236 | Chaddock | Sept. 3, 1907 |
| 975,831 | Chaddock | Nov. 15, 1910 |
| 1,729,611 | Forrest | Oct. 1, 1929 |
| 1,735,406 | Moore | Nov. 12, 1929 |
| 1,800,890 | Johnston | Apr. 14, 1931 |
| 1,937,850 | Stansbury | Dec. 5, 1933 |
| 1,965,500 | Knott | July 3, 1934 |
| 1,991,033 | Steinwand | Feb. 12, 1935 |
| 2,131,861 | Anstice | Oct. 4, 1938 |